US009112986B2

(12) United States Patent
Tucker et al.

(10) Patent No.: US 9,112,986 B2
(45) Date of Patent: Aug. 18, 2015

(54) SUPPLEMENTAL AUDIO SIGNAL PROCESSING FOR A BLUETOOTH AUDIO LINK

(71) Applicant: Apple Inc., Cupertino, CA (US)

(72) Inventors: Brian J. Tucker, Sunnyvale, CA (US); Aarti Kumar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 13/709,933

(22) Filed: Dec. 10, 2012

(65) Prior Publication Data
US 2013/0331034 A1 Dec. 12, 2013

Related U.S. Application Data

(60) Provisional application No. 61/657,559, filed on Jun. 8, 2012.

(51) Int. Cl.
*H04B 7/00* (2006.01)
*H04M 1/725* (2006.01)
*H04M 1/60* (2006.01)

(52) U.S. Cl.
CPC .......... *H04M 1/7253* (2013.01); *H04M 1/6066* (2013.01); *H04M 2250/02* (2013.01)

(58) Field of Classification Search
CPC .......... H04M 1/7253; H04M 2250/02; H04M 1/6066
USPC ....................................................... 455/41.2
See application file for complete search history.

(56) References Cited

U.S. PATENT DOCUMENTS

| | | | |
|---|---|---|---|
| 8,150,475 B2 | 4/2012 | Gilmore, II et al. | |
| 8,254,837 B2 | 8/2012 | Tian et al. | |
| 8,831,611 B2 | 9/2014 | Koo et al. | |
| 2009/0109894 A1 | 4/2009 | Ueda et al. | |
| 2009/0197640 A1 | 8/2009 | Fa et al. | |
| 2010/0099356 A1 | 4/2010 | Forrest | |
| 2011/0028093 A1 | 2/2011 | Patel et al. | |

(Continued)

FOREIGN PATENT DOCUMENTS

| | | |
|---|---|---|
| DE | 102013104564 | 11/2013 |
| GB | 2421663 | 6/2006 |
| WO | 2011128489 | 10/2011 |

OTHER PUBLICATIONS

International Search Report and Written Opinion in Application No. PCT/US2013/042691, mailed Jul. 16, 2013, pp. 1-9.

(Continued)

*Primary Examiner* — Eugene Yun
(74) *Attorney, Agent, or Firm* — Meyertons, Hood, Kivlin, Kowert & Goetzel, P.C.

(57) ABSTRACT

Providing supplemental audio signal processing for a Bluetooth audio link. A wireless device may establish a bi-directional wireless audio link with a Bluetooth device. An indication may be received that the Bluetooth device supports audio signal processing. A device type of the Bluetooth device may be determined. The wireless device may perform one or more audio signal processing operations on audio data transmitted to and/or received from the Bluetooth device via the bi-directional wireless audio link. The audio signal processing operations may be selected based on the device type of the Bluetooth device, and may be performed in addition to audio signal processing operations which may be performed on the audio data by the Bluetooth device.

24 Claims, 3 Drawing Sheets

(56) References Cited

U.S. PATENT DOCUMENTS

2012/0069131 A1  3/2012  Abelow
2012/0302170 A1  11/2012 Frazier et al.
2013/0295990 A1  11/2013 Jechoux

OTHER PUBLICATIONS

Office Action from Taiwanese Application No. 102120194, issued Jan. 6, 2015, English and Chinese versions, pp. 1-16.
International Preliminary Report on Patentability from PCT/US2013/042691, issued Dec. 18, 2014, Apple Inc., pp. 1-7.

SUPPLEMENTAL AUDIO SIGNAL PROCESSING FOR A BLUETOOTH AUDIO LINK

PRIORITY CLAIM

The present application claims benefit of priority to U.S. Provisional Application No. 61/657,559 titled "Supplemental Audio Signal Processing for a Bluetooth Audio Link" and filed on Jun. 8, 2012, whose inventors are Brian J. Tucker and Aarti Kumar, and which is hereby incorporated by reference in its entirety as though fully and completely set forth herein.

FIELD

The present application relates to wireless communication, and more particularly to a system and method for providing supplemental audio processing support for a Bluetooth audio link.

DESCRIPTION OF THE RELATED ART

Presently, many user devices, such as cell phones, tablet computers, etc., are used to make phone calls, perform audio or audiovisual chats, or otherwise establish bi-directional audio links with other devices. As part of providing support for this, such user devices may sometimes include audio signal processing capabilities, e.g., for improving the quality of audio provided to the user(s) via such audio links.

In addition, such user devices are often used in conjunction with Bluetooth devices, e.g., for hands-free operation in vehicles or other situations in which it is desirable to have one's hands available. Many Bluetooth devices are configured to provide audio signal processing support for audio links. When this is the case, it is typical for a Bluetooth device to inform the user device with which it is linked that the Bluetooth device supports audio processing, based on which the user device may turn off or avoid using any of its own audio processing capabilities, at least for the duration of the audio link (e.g., call).

Bluetooth devices come in many different varieties, and are made by many different manufacturers, with widely varying quality and price points. As a result, the quality and nature of the audio processing provided by various Bluetooth devices varies tremendously. In some situations, the Bluetooth audio processing may be of substantially lower quality than the audio processing natively provided by user devices. However, because the audio processing capabilities of the user device are not used when a Bluetooth device provides audio processing support, the quality of audio provided to the user(s) via such audio links may suffer. Accordingly, improvements in the field would be desirable.

SUMMARY

In light of the foregoing and other issues, various embodiments are described herein of a system and method for providing supplemental audio signal processing support for a Bluetooth audio link.

The system and method may include a wireless device (e.g., a cell phone) providing selective audio signal processing support operations for audio provided to and/or received from a Bluetooth device. The Bluetooth device may provide its own audio signal processing for audio signals received at the Bluetooth device and transmitted from the Bluetooth device, but depending on the type of Bluetooth device, the audio quality of the resulting audio signals may not be ideal.

Advantageously, then, according to embodiments of this disclosure, some supplemental audio signal processing may be performed by the wireless device. In particular, the wireless device may perform specific audio signal processing operations which are selected based on a type of the Bluetooth device. The parameters of the selected signal processing operations may be further refined based on the type of Bluetooth device, if desired.

Thus, by providing selected supplemental audio signal processing operations by the wireless device in addition to audio signal processing performed by the Bluetooth device, a better overall quality audio presentation may be obtained.

Embodiments of the disclosure may include a method for a wireless device to provide supplemental audio processing support for a Bluetooth audio link, a wireless device configured to implement the method, and/or a computer accessible memory medium including program instructions executable to implement the method. The method may be performed as follows.

A first bi-directional audio link may be established between the wireless device and a second device. The first bi-directional audio link may be established via a wireless network, a telephone line, a wired network, and/or any of a variety of other types of links. According to one set of embodiments, the first bi-directional audio link may include a phone call or audio chat application between the wireless device (e.g., which may be used by a first user) and the second device (e.g., which may be used by a second user).

A second bi-directional audio link may be established between the wireless device and a Bluetooth device. The second bi-directional audio link may be established via a wireless link according to the Bluetooth protocol, e.g., may be a Bluetooth link. The second bi-directional audio link may, for example, link the wireless device (e.g., which may be used by the first user) with a hands-free Bluetooth device (e.g., which may also be used by the first user). Audio data may be provided between the second device and the Bluetooth device via the first and second bi-directional audio links, e.g., via the wireless device. Note that the first and second bi-directional audio links may, in some cases (e.g., typical phone calls and audio chat applications), be voice audio links.

The wireless device may receive an indication that the Bluetooth device supports audio signal processing. The indication may be received as part of establishing the second bi-directional audio link, or at another time (e.g., prior to establishing the second bi-directional audio link, during device discovery). The indication that the Bluetooth device supports audio signal processing may include a command to the wireless device to turn off audio signal processing at the wireless device.

The wireless device may determine a device type of the Bluetooth device. Determining the device type may be as simple as distinguishing between headsets, car audio systems, etc., in some embodiments. Alternatively, or in addition, determining the device type may include determining a manufacturer and/or a model of the Bluetooth device. The device type of the Bluetooth device may be determined as part of device discovery/initial protocol negotiations, or may be determined as part of establishing the second bi-directional audio link, or at another time, as desired.

The wireless device may perform one or more audio signal processing operations on audio data transmitted to and/or received from the Bluetooth device via the bi-directional wireless audio link. The one or more audio signal processing operations may be performed by the wireless device despite the indication that the Bluetooth device provides audio signal processing support and/or the command to turn off audio signal processing at the wireless device. The one or more audio signal processing operations may be selected based on the device type of the Bluetooth device. Additionally, if desired, the parameters of the audio signal processing operations may be selected based on the device type of the Bluetooth device. Or, as an alternative, the same types of audio signal processing operations may be performed for all Bluetooth devices, and only the parameters of the audio signal processing operations may be different for different types of Bluetooth devices.

Different types of audio signal processing operations may be performed on audio data being transmitted to the Bluetooth device than on audio data being received from the Bluetooth device, if desired. For example, one or more first audio signal processing operations might be performed on first audio data (e.g., received via the first bi-directional audio link) prior to transmitting the first audio data via the second bi-directional audio link, while one or more second audio signal processing operations might be performed on second audio data received via the second bi-directional audio link (e.g., prior to transmitting the second audio data via the first bi-directional audio link). The first audio signal processing operations may, for example, include an equalization operation and a gain level adjustment, while the second audio signal processing operations may, for example, include a noise suppression operation.

BRIEF DESCRIPTION OF THE DRAWINGS

A better understanding of the present subject matter can be obtained when the following detailed description is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second (different) computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Wireless Device—any of various types of computer systems devices which are mobile or portable and which performs wireless communications. Examples of wireless devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "wireless device" can be broadly defined to encompass any electronic, computing, and/or telecommunications device (or combination of devices) which is easily transported by a user and capable of wireless communication. A Wireless Device may also be referred to as a User Equipment ("UE").

Base Station—The term "Base Station" has the full breadth of its ordinary meaning, and at least includes a wireless communication station installed at a fixed location and used to communicate as part of a wireless telephone system or radio system.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
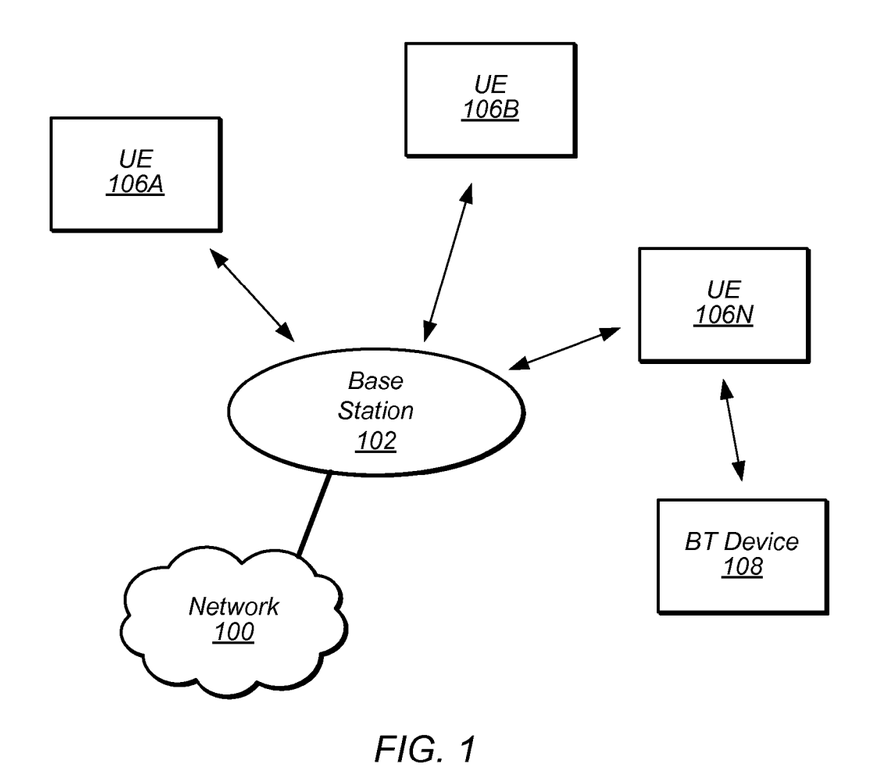
FIG. 1 illustrates an exemplary wireless communication system where multiple user devices communicate with an access point.
Figure 2:
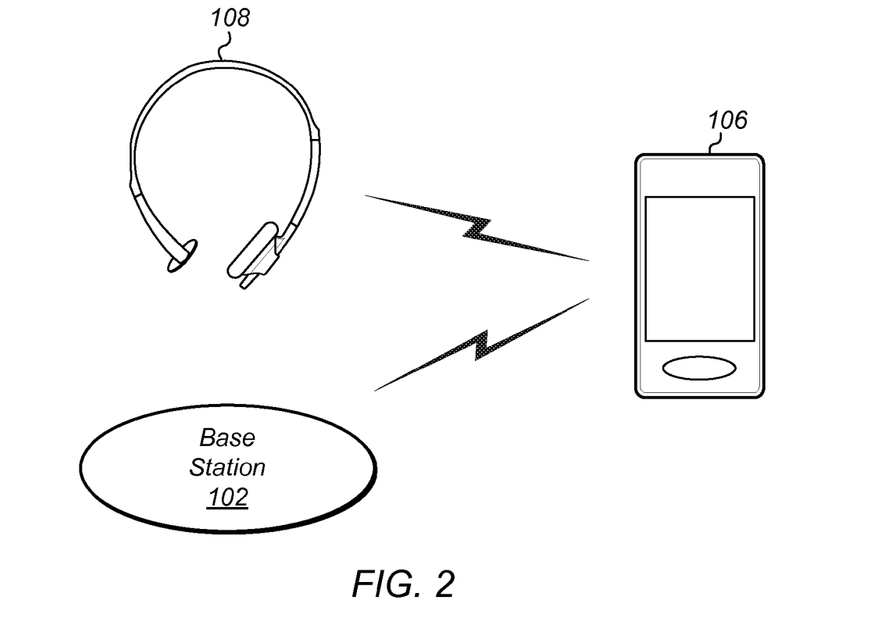
FIG. 2 illustrates an access point in communication with a wireless device.

FIGS. 1 and 2—Exemplary Communication System

FIGS. 1 and 2 illustrate an exemplary (and simplified) wireless communication system. It is noted that the system of FIG. 1 is merely one example of a possible system, and embodiments of the disclosure may be implemented in any of various systems, as desired.

As shown, the exemplary wireless communication system includes a base station 102 which communicates over a transmission medium with one or more wireless devices 106A through 106N. The base station 102 may be a 802.11 (e.g., a, b, g, n, ac, etc.) wireless access point, or may be a base station or an access point of another wireless protocol (e.g., WiMAX, GSM, CDMA, LTE, etc.). The access point 102 may provide a connection to another network 100, such as the Internet, and/or a cellular network. Thus, the access point 102 may allow wireless devices A-N to communicate with other wireless and/or wired devices via the Internet and/or a cellular network.

A wireless device 106 may also communicate with a Bluetooth device 108 via a Bluetooth link in some embodiments. The Bluetooth device 108 may be any of a variety of types of Bluetooth devices, including a headset, a car speaker system, mouse, keyboard, or other input device, another wireless device, etc. The Bluetooth device 108 may be a type of Bluetooth device which supports bi-directional audio links (such as a headset or car stereo system which includes a microphone).

FIG. 2 illustrates wireless device 106 (e.g., one of the devices 106A through 106N) in communication with the base station 102 and a Bluetooth device 108. The wireless device 106 may be a device with wireless network connectivity such as a mobile phone, a hand-held device, a computer or a tablet, or virtually any type of wireless device. The wireless device 106 may include a processor that is configured to execute program instructions stored in memory. The wireless device 106 may perform any of the embodiments described herein by executing such stored instructions. The wireless device 106 may also or alternatively include a programmable hardware element such as an FPGA (field-programmable gate array) that is configured to perform any of the method embodiments described herein, or any portion of any of the method embodiments described herein.

Figure 3:
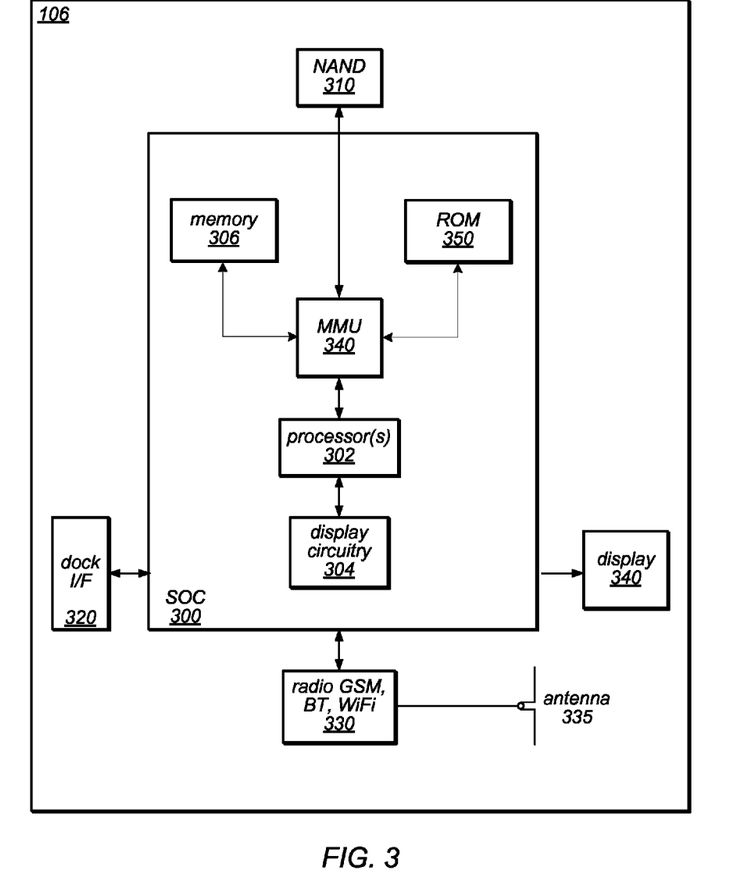
FIG. 3 illustrates an exemplary block diagram of a wireless device.

FIG. 3—Exemplary Block Diagram of a Wireless Device

FIG. 3 illustrates an exemplary block diagram of a wireless device 106. As shown, the wireless device 106 may include a system on chip (SOC) 300, which may include portions for various purposes. For example, as shown, the SOC 300 may include processor(s) 302 which may execute program instructions for the wireless device 106 and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector OF 320, and/or display 340. The MMU 340 may be configured to perform memory protection and page table translation or set up. In some embodiments, the MMU 340 may be included as a portion of the processor(s) 302.

As also shown, the SOC 300 may be coupled to various other circuits of the wireless device 106. For example, the wireless device 106 may include various types of memory (e.g., including NAND flash 310), a connector interface 320 (e.g., for coupling to the computer system), the display 340, and wireless communication circuitry 330 (e.g., for LTE, CDMA, GSM, Bluetooth, WiFi, etc.) which may use antenna 335 to perform the wireless communication.

The hardware and/or software of the wireless device 106 may be used to implement various embodiments described herein. For example, the one or more of the memories of the wireless device 106 may store program instructions executable to implement embodiments discussed herein.

Figure 4:
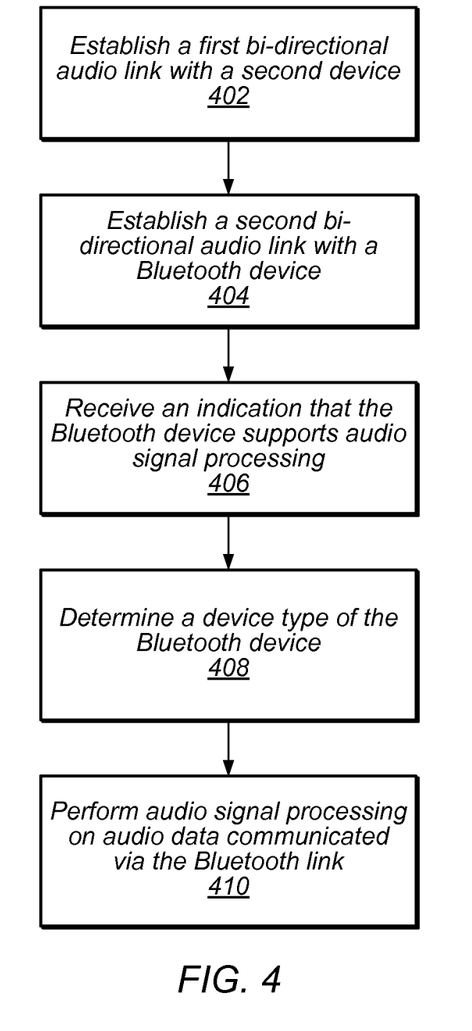
FIG. 4 is a flowchart diagram illustrating a method for a wireless device to provide supplemental audio processing support for a Bluetooth audio link.

FIG. 4—Providing Supplemental Audio Processing Support for a Bluetooth Audio Link Bi-directional audio links, such as phone calls, audio and audiovisual chat applications, and other such audio links (collectively referred to herein as "calls") are a core function of many wireless devices, such as mobile phones, tablets, and other portable computing devices. Many such wireless devices accordingly include audio processing functionality, such as equalization and other filtering, gain control, noise suppression, etc. Such operations may typically be performed by the wireless device on incoming and/or outgoing audio data during a call.

Such devices typically require that a user's hands be available to hold or otherwise operate the wireless device. There are, however, many situations in which it is desirable to make a call in which one's hands are not free to operate one's wireless device, such as while driving a car. In such and other situations, the use of a Bluetooth device for hands-free operation is common. The wireless device may establish an audio link with the Bluetooth device, such that the Bluetooth device receives audio input for use in a call from the user (e.g., via a microphone) and presents audio output from the call to the user (e.g., via a speaker).

Bluetooth devices which are configured for bi-directional audio communication often also include audio processing functionality. In a situation in which the Bluetooth device provides speaker(s) and microphone(s), in theory it may make sense for the Bluetooth device to provide its own audio signal processing, which may be designed and configured to operate in a manner tailored to the particular specifications of the Bluetooth device's speaker(s) and microphone(s). As such, conventionally a Bluetooth device with audio processing functionality will indicate to a wireless device that the Bluetooth device includes audio processing functionality, and the wireless device will switch off its audio processing functionality in favor of the Bluetooth device.

However, in practice, the audio quality resulting from a Bluetooth device providing all of its own audio processing functionality is sometimes lacking. For example, in some cases audio from car speakers may sound tinny, certain ranges of voice audio may be clipped at a headset, background noise from a Bluetooth microphone may be insufficiently suppressed, and/or any number of other audio quality problems may remain.

Since the wireless device may have native audio signal processing, it may be desirable for the wireless device to provide supplemental audio signal processing in such situations. Accordingly, some embodiments of the disclosure are directed to a system and method for a wireless device to provide supplemental audio processing support for a Bluetooth audio link. FIG. 4 illustrates one set of embodiments of such a method.

The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, a first bi-directional audio link between the wireless device and a second device may be established. The first bi-directional audio link may be a phone call (via a cellular network and/or POTS), an audio or audiovisual chat application (e.g., via the Internet), or any other bi-directional audio link. The first bi-directional audio link may also be referred to herein as the first call.

The first bi-directional audio link may include wireless and/or wired links, e.g., depending on the type of audio link and/or the nature of the wireless device and the second device. For example, the first bi-directional audio link may include one or more of a link to a cellular network via a base station, a link to the internet via a wired or wireless local or wide area network connection, a link to a land-line telephone, or any combination of the above.

The wireless device and the second device may each be any of a variety of types of devices. For example, either or both of the wireless device and the second device may be a mobile phone, a land line phone, a tablet, laptop, or desktop computer, or any other type of device configured for bi-directional audio communication. However, the wireless device may at least be configured to communicate wirelessly via a Bluetooth connection, as described further below.

The second device may provide audio data to the wireless device via the first bi-directional audio link and may receive audio data from the wireless device via the first bi-directional audio link. The audio data may include speech data, music, and/or any other type of audio data.

In 404, a second bi-directional audio link between the wireless device and a Bluetooth device may be established. The second bi-directional audio link may be a Bluetooth link, e.g., a wireless link established via the Bluetooth protocol. Thus, the second bi-directional audio link may provide a local (e.g., personal area network) wireless connection between the wireless device and the Bluetooth device. This may allow a user of the wireless device to participate in the first call via the Bluetooth device. For example, the user may be driving a car, and the Bluetooth device may be a headset or a car audio system configured to allow the user to operate the wireless device in a hands-free manner. Alternatively, the user may be at a workstation, and the Bluetooth device may be a headset enabling the user to type or use a mouse while participating in the first call. Such a Bluetooth link may alternatively or additionally be used in any number of other scenarios.

Thus, the wireless device may provide audio data received from the second device via the first bi-directional audio link to the Bluetooth device via the second bi-directional audio link, and may provide audio data received from the Bluetooth device via the second bi-directional audio link to the second device via the first bi-directional audio link.

In 406, an indication may be received that the Bluetooth device supports audio signal processing. The Bluetooth device may be configured to perform various audio signal processing operations on audio data received from and/or transmitted to the wireless device via the second bi-directional audio link. For example, the Bluetooth device may perform one or more of filtering, gain control, noise suppression/cancellation, echo cancellation, compression/decompression, and/or any of a variety of other audio signal processing operations.

The Bluetooth device may provide an indication that it supports audio signal processing to the wireless device in order that the wireless device switch off or otherwise avoid performing audio signal processing operations on the audio signals. As one example, of an indication that the Bluetooth device supports audio signal processing, the Bluetooth device might provide an indication that the Bluetooth device is echo cancellation/noise reduction (ECNR) enabled. In some cases the indication may be a command to the wireless device to turn off its audio signal processing capability.

The indication may be received by the wireless device as part of establishing the second bi-directional audio link between the wireless device and the Bluetooth device. As another possibility, the indication may be received by the wireless device prior to establishing the second bi-directional audio link; for example, the indication may be received during a device discovery process, if desired.

In 408, a device type of the Bluetooth device may be determined. The device type may be a device type at any of multiple levels of granularity. For example, the device type may simply be a broad class of device such as a 'headset' or 'car audio system'. Further division of device types (e.g., 'headsets' may be single ear-piece or dual ear-piece, monaural or stereo, etc.) may also or alternatively be used. As a further possibility, more specific device type information may be determined, such as the manufacturer and/or model of the Bluetooth device. For example, if the Bluetooth device is a car audio system, the device type may include the type (e.g., make, model) of car.

The Bluetooth device type may be determined during (and/or based on) a device discovery process, e.g., based on information (e.g., profile information) provided by the Bluetooth device. Alternatively, or in addition, the Bluetooth device type may be determined during (and/or based on) establishment of the second bi-directional audio link.

In 410, audio signal processing may be performed by the wireless device on audio data communicated via the Bluetooth link. As noted above, the Bluetooth device may have indicated to the wireless device that the Bluetooth device supports audio signal processing. The audio signal processing performed by the wireless device in step 410 may accordingly be supplemental audio signal processing. For example, the audio signal processing performed by the wireless device may be selected specifically to supplement the audio processing capabilities of Bluetooth devices of the type which the Bluetooth was determined to be in step 408. The wireless device may thus perform the audio signal processing despite the indication (or even command) from the Bluetooth device that the Bluetooth device supports audio signal processing.

The wireless device may perform one or more audio signal processing operations on audio data transmitted to and/or received from the Bluetooth device via the second bi-directional audio link. The audio signal processing operations may be the same or different for uplink and downlink audio data. For example, one or more first audio signal processing operations may be performed on audio data transmitted to the Bluetooth device via the Bluetooth link, while one or more second (e.g., different) audio signal processing operations may be performed on audio data received from the Bluetooth device via the Bluetooth link. As noted above, the specific operations selected may be based on a device type of the Bluetooth device; in addition, if desired, the parameters of the audio signal processing operations may be selected based on the device type of the Bluetooth device.

For example, audio presented by certain types of Bluetooth devices may benefit from one or more types of equalization or filtering. The type of filtering may depend on the type of Bluetooth device; for example, some Bluetooth devices may benefit from high-pass filtering, while others may benefit from low-pass filtering, and still others may benefit from band-pass filtering. Accordingly, the wireless device may perform one or more filtering operations on audio data which will be transmitted to and presented by the Bluetooth device; the type and parameters (e.g., range) of filtering may be determined based on the Bluetooth device type.

As another example, audio presented by certain types of Bluetooth devices may benefit from gain level adjustment. For example, certain types of Bluetooth devices may present muted or excessively loud audio ranges if provided with unprocessed audio data. Accordingly, the wireless device may perform one or more gain level adjustment operations on audio data which will be transmitted to and presented by the Bluetooth device; the parameters (e.g., the actual gain level adjustment) may be determined based on the Bluetooth device type.

As a further example, audio received from certain types of Bluetooth devices may benefit from noise suppression. For example, certain types of Bluetooth devices may provide insufficient noise suppression in certain frequency ranges or in general. Accordingly, the wireless device may perform one or more noise suppression operations on audio data which is received from the Bluetooth device; the parameters (e.g., the range(s) and amount(s) of noise suppression) may be determined based on the Bluetooth device type.

Any number of other supplemental audio signal processing operations may also or alternatively be performed by the wireless device. The supplemental audio signal processing operations may be performed in addition to any audio signal processing operations performed on the audio data by the Bluetooth device prior or subsequent to the audio signal processing operations performed by the wireless device.

Note that since the supplemental audio signal processing operations may have been selected based on the type of Bluetooth device which is performing its own audio signal processing operations, and may be configured to complement those audio signal processing operations, the combination of audio signal processing operations by the wireless device and the Bluetooth device may advantageously provide improved quality audio over the Bluetooth link, potentially providing a significant improvement in user experience.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a User Equipment or UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible memory medium comprising program instructions executable by a wireless device to:
   establish a bi-directional wireless audio link with a Bluetooth device;
   receive an indication that the Bluetooth device supports audio signal processing, wherein the indication that the Bluetooth device supports audio signal processing comprises a command to turn off audio signal processing at the wireless device;
   determine a device type of the Bluetooth device;
   perform one or more audio signal processing operations on audio data transmitted to and/or received from the Bluetooth device via the bi-directional wireless audio link, wherein the one or more audio signal processing operations are selected based on the device type of the Bluetooth device, wherein the one or more audio signal processing operations are performed by the wireless device despite the command to turn off audio signal processing at the wireless device.

2. The memory medium of claim 1,
   wherein the one or more audio signal processing operations comprise a filtering operation, wherein the filtering operation is performed on audio data transmitted to the Bluetooth device.

3. The memory medium of claim 2,
   wherein the filtering operation comprises one of a high-pass filtering operation, a low-pass filtering operation, or a band-pass filtering operation.

4. The memory medium of claim 2,
   wherein parameters of the filtering operation are selected based on the device type of the Bluetooth device.

5. The memory medium of claim 1,
   wherein the one or more audio signal processing operations comprise a gain level adjustment, wherein the gain level adjustment is performed on audio data transmitted to the Bluetooth device.

6. The memory medium of claim 5,
   wherein parameters of the gain level adjustment are selected based on the device type of the Bluetooth device.

7. The memory medium of claim 1,
wherein the one or more audio signal processing operations comprise a noise suppression operation, wherein the noise suppression operation is performed on audio data received from the Bluetooth device.

8. The memory medium of claim 7,
wherein parameters of the noise suppression operation are selected based on the device type of the Bluetooth device.

9. The memory medium of claim 1,
wherein the audio link comprises a voice audio link.

10. The memory medium of claim 1, wherein the program instructions are further executable to:
establish a bi-directional wireless audio link with a second wireless device via a wireless network.

11. A method for a wireless device to provide supplemental audio signal processing, the method comprising:
establishing a first bi-directional audio link with a second device;
establishing a second bi-directional audio link with a Bluetooth device, wherein audio data is provided between the second device and the Bluetooth device via the first and second bi-directional audio links;
receiving an indication that the Bluetooth device supports audio signal processing, wherein the indication that the Bluetooth device supports audio signal processing comprises a command to turn off audio signal processing at the wireless device;
performing one or more first audio signal processing operations on first audio data received via the first bi-directional audio link prior to transmitting the first audio data via the second bi-directional audio link;
performing one or more second audio signal processing operations on second audio data received via the second bi-directional audio link prior to transmitting the second audio data via the first bi-directional audio link
wherein at least one of said performing first audio signal processing or second audio signal processing is performed by the wireless device despite the command to turn off audio signal processing at the wireless device.

12. The method of claim 11,
wherein the first audio signal processing operations are different than the second audio signal processing operations.

13. The method of claim 11,
wherein the first audio signal processing operations comprise an equalization operation and a gain level adjustment;
wherein the second audio signal processing operations comprise a noise suppression operation.

14. The method of claim 11, further comprising
determining a device type of the Bluetooth device;
wherein parameters of the first and second audio signal processing operations are selected based on the device type of the Bluetooth device.

15. The method of claim 14,
wherein determining the device type of the Bluetooth device comprises determining that the Bluetooth device is one of the following device types:
a headset;
a car audio system.

16. The method of claim 14,
wherein determining the device type of the Bluetooth device comprises determining a manufacturer and/or a model of the Bluetooth device.

17. A wireless device configured to provide supplemental audio signal processing, the wireless device comprising:
an antenna;
a processor;
a non-transitory computer-readable memory medium comprising program instructions executable by the processor to:
establish a Bluetooth link with a Bluetooth device via the antenna, wherein the Bluetooth link provides a wireless connection for exchanging audio signals between the wireless device and the Bluetooth device, wherein the Bluetooth device is configured to provide audio signal processing for audio signals exchanged via the Bluetooth link;
establish a call with a second device, wherein the call provides a connection for exchanging audio signals between the wireless device and the second device;
perform first audio signal processing on first audio signals received via the call;
transmit the processed first audio signals to the Bluetooth device via the Bluetooth link;
perform second audio signal processing on second audio signals received via the Bluetooth link;
transmit the processed second audio signals to the second device via the call;
wherein at least one of the first audio signal processing or the second audio signal processing is performed by the wireless device despite a command received from the Bluetooth device to turn off audio signal processing at the wireless device.

18. The wireless device of claim 17, wherein the program instructions are further executable to:
receive a command from the Bluetooth device via the Bluetooth link, wherein the command indicates that the Bluetooth device supports audio signal processing, wherein the command indicates to the wireless device to not provide audio signal processing on audio signals transmitted to or received from the Bluetooth device via the Bluetooth link.

19. The wireless device of claim 18,
wherein the command indicates that the Bluetooth device is echo cancellation/noise reduction (ECNR) enabled.

20. The wireless device of claim 17,
wherein the Bluetooth device comprises a vehicle audio system;
wherein to establish the Bluetooth link with the Bluetooth device, the program instructions are further executable to determine a make and model of the vehicle.

21. The wireless device of claim 20,
wherein the first audio signal processing and the second audio signal processing comprise different audio signal processing operations and/or utilize different parameters;
wherein operations and/or parameters of operations performed as part of the first audio signal processing and the second audio signal processing are selected at least in part based on the make and model of the vehicle.

22. A wireless device configured to provide supplemental audio signal processing, the wireless device comprising:
an antenna;
a processor;
a non-transitory computer-readable memory medium comprising program instructions executable by the processor to:
establish a wireless audio link with a Bluetooth device via the antenna;
receive an indication that the Bluetooth device supports audio signal processing, wherein the indication that the Bluetooth device supports audio signal processing comprises a command to turn off audio signal processing at the wireless device;

receive first audio data, wherein the first audio data is for transmission to the Bluetooth device via the wireless audio link;

perform one or more audio signal processing operations on the first audio data;

transmit the first audio data to the Bluetooth device via the wireless audio link;

wherein the one or more audio signal processing operations are performed by the wireless device despite the command to turn off audio signal processing at the wireless device.

23. The wireless device of claim 22, wherein the program instructions are further executable to:

determine a device type of the Bluetooth device;

wherein the one or more audio signal processing operations are selected based on the device type of the Bluetooth device.

24. The wireless device of claim 22, wherein the first audio data is received via an audio link with a second device, wherein the program instructions are further executable to:

receive second audio data, wherein the second audio data is received from the Bluetooth device via the wireless audio link;

perform one or more audio signal processing operations on the second audio data;

transmit the second audio data to the second device via the audio link with the second device.

* * * * *